(12) United States Patent
Lee

(10) Patent No.: US 6,589,928 B1
(45) Date of Patent: Jul. 8, 2003

(54) NON-TOXIC, MICROBICIDAL CLEANING AGENT CONTAINING BIOACTIVE GLASS PARTICLES

(75) Inventor: Sean Lee, Karlsruhe (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/030,279
(22) PCT Filed: Jul. 7, 2000
(86) PCT No.: PCT/DE00/02230
  § 371 (c)(1),
  (2), (4) Date: Apr. 5, 2002
(87) PCT Pub. No.: WO01/04252
  PCT Pub. Date: Jan. 18, 2001

(30) Foreign Application Priority Data

Jul. 9, 1999 (DE) .......................... 199 32 238

(51) Int. Cl.$^7$ ................................ C11D 3/14
(52) U.S. Cl. ................ 510/382; 510/268; 510/368; 510/395
(58) Field of Search ............... 510/268, 368, 510/395, 382

(56) References Cited

U.S. PATENT DOCUMENTS

| | | | | |
|---|---|---|---|---|
| 4,155,870 A | * | 5/1979 | Jorgensen | 252/131 |
| 5,074,916 A | | 12/1991 | Hench et al. | |
| 5,834,008 A | * | 11/1998 | Greenspan et al. | 424/443 |
| 6,054,400 A | * | 4/2000 | Brink et al. | 501/63 |

FOREIGN PATENT DOCUMENTS

| | | |
|---|---|---|
| DE | 752 622 | 8/1951 |
| DE | 38 24 253 A1 | 2/1989 |
| WO | 88/00613 * | 1/1988 |
| WO | 96/28382 | 9/1996 |

OTHER PUBLICATIONS

Larry L. Hench and John K. West: "Biological Applications of Bioactive Glasses" Life Chemistry Reports 1996, vol. 13, p. 187–241.

"An Introduction to Bioceramic" L. Hench and J. Wilson, Eds. World Scientific, NJ 1993, pp. 41–63.

John E. Rectenwald et al: "Bioglass Elicits an Anti–Inflammatory response . . . ", Infection and Immunity, 19. Annual Meeting, Surgical Infection Society 1999 28.4–01.05.1999, pp. 2–21.

J. Allen et al: "Antibacterial Properties of a Bioactive Glass", Departments of Microbiology and Peridontology, Eastman Dental Institute, London.

Thorsten Bechert "A New Method for Screening Anti–Infective Biomaterials", Nature Medicine, vol. 6, No. 8, Sep. 2000, pp. 1053–1056.

\* cited by examiner

*Primary Examiner*—Charles Boyer
(74) *Attorney, Agent, or Firm*—Michael J. Striker

(57) ABSTRACT

A non-toxic cleaning agent with biocidal and dirt-removing properties, which is used together with a solvent, contains at least one surface-active agent and phosphorus-containing bioactive glass particles. The glass particles preferably release at least 300 µg of alkali metal ions per gram, have an average size of less than 400 µm and contain $SiO_2$, CaO, $Na_2O$, $CaF_2$, $B_2O_3$, $K_2O$ and/or MgO, as well as $P_2O_5$. These cleaning agents are particularly well suited for cleaning surfaces and textile materials, for use in dishwashing detergents and particularly in medical and food-serving establishments.

15 Claims, No Drawings

NON-TOXIC, MICROBICIDAL CLEANING AGENT CONTAINING BIOACTIVE GLASS PARTICLES

BACKGROUND OF THE INVENTION

The invention relates to a nontoxic, fabric-sparing cleaning agent with microbicidal action, particularly for textiles, and to its preparation and use.

Cleaning agents are usually compositions containing surface-active agents capable of solubilizing dirt in a solvent, particularly in an aqueous solvent. Because most dirt contains fats or has fat-like properties, it is removed with surface-active agents, particularly surfactants. In this manner, however, only fat-containing dirt can be solubilized. Other kinds of dirt such as, for example, proteins or protein-containing dirt, for example blood stains, colored substances, for example coffee or tea, and invisible dirt, particularly microorganisms, however, cannot be removed readily in this manner. For this reason, cleaning agents usually also contain at least one bleaching agent and/or at least one disinfectant, so that the remaining dirt is removed, at least in optical terms. After the removal of fatty and pigmented dirt, stains are usually removed oxidatively.

To this end, chlorine-releasing chemicals are often used which, because of their high oxidation potential, at the same time also act as disinfectants. Such oxidation, however, often destroys only the colored part of the stain, and the other insoluble substances remain contaminated with the base substance. Because of its high reactivity, however, chlorine bleach has the drawback of attacking colored textiles and in many cases changing their color or causing discoloration. Moreover, the aggressive chlorine bleach attacks the material to be cleaned, particularly textiles, so that after multiple washings their basic structure is destroyed, which reduces their strength.

For this reason, attempts have been made in the past to accomplish oxidative bleaching with peracetic acid. Although the acid, per se, exerts a sufficient disinfecting action, its penetration into porous materials is low, which particularly in the case of textiles results in insufficient sterilization. Moreover, like chlorine bleach, peracetic acid, which in cleaning agents is formed from perborates and cleaved-off acyl radicals, exerts an oxidative action although to a lower degree.

This oxidative action, although sufficient to exert the bleaching action that destroys colored stains and although gentler to many materials than are other bleaching agents, does not exert adequate disinfecting action in all cases. For example, aerobic spore-formers are not removed. Moreover, the use of per acids causes considerable damage to wool.

Finally, peroxide compounds react with proteinaceous dirt causing aging of the protein, particularly in the case of blood stains. Aged proteins, however, are removed more or less incompletely by cleaning agents when such agents are allowed to act for the usual length of time.

SUMMARY OF THE INVENTION

Hence, the object of the invention is to provide a cleaning agent which besides good cleaning properties exerts a sterilizing action, but in itself is not toxic.

Bioactive glasses have been known for a long time and have been described in summary form, for example, by Larry L. Hench and John. K. West in "Biological Applications of Bioactive Glasses", Life Chemistry Reports 1996, vol. 13, pp. 187–241, or in "An Introduction to Bioceramics", L. Hench and J. Wilson, eds., World Scientific, New Jersey (1993). Bioactive glasses, in contrast to conventional glasses, are characterized in that they are soluble in an aqueous medium and that they form a layer of hydroxyapatite on their surface. Most current bioactive glasses are prepared either as fusible glass, in which case they contain much less $SiO_2$ and much more sodium than normal window or bottle glasses, or they are sol-gel glasses which then, in contrast to fusible glasses, contain a high amount of silicon dioxide and a small amount of sodium or no sodium at all.

The essential properties of bioactive glass are known to those skilled in the art and have been described, for example, in U.S. Pat. No. 5,074,916. Bioactive glass thus differs from conventional lime-sodium-silicate glasses in that it binds to living tissues.

Such bioactive glasses are used, for example, for healing damaged bones and particularly as synthetic bone transplants. Moreover, they are being used successfully in the healing of chronic wounds, particularly diabetic ulcers, as well as pressure sores and bed sores of elderly patients. For example, John E. Rectenwald, Sean Lee and Lyle L. Moldawer et al. (Infection and Immunity, submitted for publication) were able to show that in the mouse bioactive glass exerts an inflammatory [sic—"anti-inflammatory" seems to be meant—Translator] action brought about by stimulation of interleukin-6 (IL-6) activity and simultaneous inhibition of the inflammation-stimulating cytokines TNF-alpha, IL-1-alpha and IL-10 and of MPO (myeloperoxidase) (see also [Proceedings of the] 19th Annual Meeting, Surgical Infection Society 1999, Apr. 28–May 1, 1999).

Moreover, E. Allen et al. (Department of Microbiology and Periodontology, Eastman Dental Institute) reported that bioactive glass 45-S-5 obtainable from Bioglas®, U,S. Biomaterials, Alachua, Fla. 32615, USA, exhibits antibacterial activity not shown by normal glass beads (window glass).

Such biologically active glasses, however, release considerable amounts of $Ca^{2+}$ ions. Hence, it was to be expected that they would markedly increase the water hardness which would lead to increased calcium deposition and reduced cleaning action, so that they would not be suitable for use in detergents and cleaning agents.

Moreover, it was to be expected that the abrasive action of the glass particles would cause mechanical damage to materials and, in particular, would cause destruction of textile fabrics.

Surprisingly, we have now found that the afore-defined objective can be reached by means of a cleaning agent containing bioactive glass particles. Such particles preferably show a solubility higher than 250 µg of alkali metal ions per gram of glass, the general expression "alkali metal ions" including alkaline earth metal ions.

Surprisingly, we have now found that a cleaning agent containing such glass particles not only acts as a biocide against viruses and bacteria, but is also gentle to the skin and to fabrics, causes no allergic reactions and, moreover, is capable of eliminating difficult-to-remove dirt such as aged proteins. Surprisingly, the release of alkali metal ions, and particularly alkaline earth metal ions such as $Ca^{2+}$ and $Mg^{2+}$, does not reduce the detersive action and also does not increase calcium deposition. Moreover, the added glass particles do not cause the feared destruction of or damage to the material to be cleaned, particularly textile fabrics.

The invention thus relates to a nontoxic cleaning agent with biocidal and dirt-removing properties to be used together with a solvent, said cleaning agent comprising at least one surface-active agent. The invention is characterized in that the cleaning agent contains glass particles which release more than 250 µg of alkali metal ions or alkaline earth metal ions per gram of glass particles and/or which in an aqueous solution, particularly a physiological aqueous solution, form a hydroxyapatite layer on their surface. Preferably, the glass particles contained in the cleaning agent of the invention release more than 300 µg, and particularly more than 500 µg, of alkali metal ions per gram of glass particles. Particularly preferred are glass particles releasing more than 1 mg of alkali metal ions/alkaline earth metal ions per gram of glass.

Such cleaning agents are suitable not only for cleaning and sterilizing surfaces and surgical instruments, but also for textile materials, particularly in hospitals and clinics as well as in food-serving establishments.

The cleaning agent of the invention is also particularly well suited as a dishwashing agent, particularly for dishwashing machines.

The bioactive glass contained in the cleaning agents of the invention is preferably a conventional bioactive glass, well known to those skilled in the art. Such glasses usually contain a maximum of 60 wt. % of $SiO_2$, a high amount of $Na_2O$ and CaO as well as phosphorus, the latter in a high molar ratio of calcium to phosphorus, said ratio in most, but not necessarily all, cases having a value of about five. When such bioactive glasses come in contact with water or with a body fluid, they give rise to special reactions, namely the sodium and calcium ions of the glass are exchanged for $H^+$ ions from the solution by a cation-exchange reaction. As a result, a silanol groups-presenting surface is formed on which sodium hydroxide and calcium hydroxide accumulate. The increase in hydroxyl ion concentration at the glass surface now brings about a further reaction with the silicon network giving rise to additional silanol groups which can also lie more deeply in the glass.

Because of the high, alkaline pH in the interstitial glass space, a mixed hydroxyapatite phase of CaO and $P_2O_6$ is formed which crystallizes on the $SiO_2$ surface and in biological materials binds to mucopolysaccharides, collagens and glycoproteins.

The molar ratio of calcium to phosphorus is preferably >2 and particularly >3 and preferably <30 and particularly <20, a ratio of <10 being particularly preferred.

Particularly preferred are cleaning agents with bioactive glass particles containing $SiO_2$, CaO, $Na_2O$, $P_2O_6$, $CaF_2$, $B_2O_3$, $K_2O$ and/or MgO. If the cleaning agent contains bioactive particles of fusible glass, these particles preferably contain 40–60 wt. % of $SiO_2$, 10–30 wt. % of CaO, 10–35 wt. % of $Na_2O$, 2–8 wt. % of $P_2O_5$, 0–25 wt. % of $CaF_2$, 0–10 wt. % of $B_2O_3$, 0–8 wt. % of $K_2O$ and/or 0–5 wt. % of MgO, based on the total weight of the glass. If the bioactive glass is a fusible glass, then the upper limit of the silicon dioxide it contains is 60 wt. % and preferably 55 wt. %, an upper limit of 50 wt. % being particularly preferred. The sodium oxide content is preferably higher than 15 wt. % and particularly higher than 18 wt. %. A sodium oxide content of $\geq 20$ wt. % is particularly preferred.

If the bioactive glass contained in the cleaning agent of the invention has been produced by the sol-gel process, its silicon dioxide content can be appreciably higher than in fusible glasses and its sodium oxide content can be nil. Bioactive glasses made by the sol-gel process preferably contain 40 to 90 wt % of $SiO_2$, 4 to 45 wt. % of CaO, 0 to 10 wt. % of $Na_2O$, 2 to 16 wt. % of $P_2O_5$, 0 to 25 wt. % of $CaF_2$, 0 to 4 wt. % of $B_2O_3$, 0 to 8 wt. % of $K_2O$ and/or 0 to 5 wt. % of MgO.

The phosphorus oxide content of both previously described kinds of bioactive glass is preferably at least 2 wt. % and particularly at least 4 wt. %.

The microbicidal glass particles present in the cleaning agents of the invention have an average particle size $d_{50}$ of $\leq 400$ µm and particularly $\leq 250$ µm, particle sizes of $\leq 100$ µm being particularly preferred. In principle, a higher surface-to-weight or surface-to-volume ratio results in a higher sterilizing biocidal activity than that of larger particles. Unusually high biocidal activity is attained, for example, with particles having an average size of <50 µm, particularly with particles of <20 µm or <10 µm, particle sizes of <5 µm being particularly preferred.

We have found, however, that in the practical range glass particle of 2 to 60 µm, particularly of 2 to 50 µm and preferably of 2 to 20 µm by their abrasive action promote the mechanical removal of dirt particles thus markedly enhancing the cleaning action.

Moreover, the cleaning agent of the invention exerts a protein-degrading, namely solubilizing action. This action manifests itself also with aged, i.e. denatured proteins.

The desired sterilizing, germ-killing action can be attained with the cleaning agent of the invention alone without adding other additives, particularly without additives releasing $Ag^+$, $Cu^+$, $Cu^{2+}$ and/or $Zn^+$. Nevertheless, such additives may be desirable for the purpose of achieving synergistic effects. The biocidal activity of the cleaning agent of the invention can be enhanced synergistically by addition of other sterilizing and germ-killing agents or agents exerting antibiotic action.

Although it was to be expected that the addition according to the invention of glass particles to a cleaning agent would, particularly for calcium-containing water, require the addition of a large amount of complexing agents to prevent lime and dirt deposition on the cleaned material, we have found, surprisingly, that the addition of deliming agents such as complexing agents, for example polyphosphates, can be markedly reduced or entirely eliminated without any feared lime deposits being formed. Rather, any existing lime deposits are removed by the abrasive action of the glass particles.

In a preferred embodiment of the invention, the cleaning agent of the invention contains the glass particles in an amount of up to 20 wt %, or up to 10 wt %, preferably up to 7 wt % and particularly up to 5 wt %, dry basis. The minimum amount is 0.01 wt % and particularly 0.1 wt %, an amount of at least 0.5 wt % or 1 wt % being particularly preferred. The usual amount is 1–4 wt %.

The invention also relates to a process for making such cleaning agents, said process being characterized in that surface-active agents, particularly a mixture of different surface-active agents, particularly surfactants, is mixed with the afore-defined glass particles and the mixture is optionally diluted with a solvent.

The invention also relates to the use of such cleaning agents for cleaning surfaces, surgical material and beverage bottles and as or in dishwashing agents. Another special use involves the cleaning of textiles particularly for medical establishments, hospital personnel and food-serving establishments.

What is claimed is:

1. A non-toxic cleaning agent with biocidal and dirt-removing properties for cleaning conjointly with a solvent, said non-toxic cleaning agent comprising at least one surface-active agent and glass particles, wherein said glass particles consist of a phosphorous-containing bioactive glass.

2. The cleaning agent as defined in claim 1, wherein said glass particles release at least 300 µg of said alkali metal ions per gram of said glass particles.

3. The cleaning agent as defined in claim 1, wherein said glass particles have an average size of less than 400 µm.

4. The cleaning agent as defined in claim 1, wherein said glass particles have an average size of less than 100 µm.

5. The cleaning agent as defined in claim 1, wherein said at least one surface-active agent is a surfactant compound.

6. The cleaning agent as defined in claim 1, wherein said phosphorus-containing bioactive glass contains from 40 to 60 percent by weight of $SiO_2$, from 10 to 30 percent by weight of CaO, from 10 to 35 percent by weight of $Na_2O$, 2 to 8 percent by weight of $P_2O_5$, up to 25 percent by weight $CaF_2$, up to 10 percent by weight of $B_2O_3$, up to 8 percent by weight of $K_2O$ and up to 5% by weight of MgO.

7. The cleaning agent as defined in claim 1, containing from 1 to 7 percent by weight of said glass particles consisting of said phosphorous-containing bioactive glass.

8. A method of preparing a non-toxic cleaning agent, said non-toxic cleaning agent comprising at least one surface-active agent and phosphorous-containing active glass particles, said method comprising adding said phosphorous-containing bioactive glass particles to said at least one surface-active agent, wherein said phosphorous-containing bioactive glass particles release at least 250 µg of said alkali metal ions per gram of said phosphorous-containing bioactive glass particles.

9. A method of cleaning at least one object or at least one surface, said method comprising the steps of:

a) providing a non-toxic cleaning agent comprising at least one surface-active agent and glass particles, said glass particles consisting of a phosphorus-containing bioactive glass; and b) treating at least one object or at least one surface with said non-toxic cleaning agent conjointly with a solvent.

10. The method as defined in claim 9, wherein said at least one object is made of a textile material.

11. The method as defined in claim 9, wherein said at least one object is a dish.

12. The method as defined in claim 9, wherein said at least one surface is in a medical establishment or in a food-serving establishment.

13. The method as defined in claim 9, wherein said glass particles have an average size of less than 400 µm and release at least 300 µg of said alkali metal ions per gram of said glass particles in an aqueous solution.

14. The method as defined in claim 9, wherein said non-toxic cleaning agent contains from 1 to 7 percent by weight of said glass particles consisting of said phosphorous-containing bioactive glass.

15. The method as defined in claim 9, wherein said phosphorus-containing bioactive glass contains from 40 to 60 percent by weight of $SiO_2$, from 10 to 30 percent by weight of CaO, from 10 to 35 percent by weight of $Na_2O$, 2 to 8 percent by weight of $P_2O_5$, up to 25 percent by weight $CaF_2$, up to 10 percent by weight of $B_2O_3$, up to 8 percent by weight of $K_2O$ and up to 5% by weight of MgO.

* * * * *